United States Patent [19]
Sano

[11] Patent Number: 6,073,385
[45] Date of Patent: Jun. 13, 2000

[54] FISH HOOK

[75] Inventor: Kazunori Sano, Nishiwaki, Japan

[73] Assignee: Gamakatsu Co., Ltd., Nishiwaki, Japan

[21] Appl. No.: 09/198,528

[22] Filed: Nov. 24, 1998

[30]     Foreign Application Priority Data

Dec. 15, 1997  [JP]  Japan .................................... 9-363683

[51] Int. Cl.[7] ........................... A01K 83/00; A01K 91/04
[52] U.S. Cl. ........................... 43/44.83; 43/43.16; 24/908
[58] Field of Search ................. 43/44.83, 44.86, 43/43.16, 44.84, 44.85; D22/144; 24/698.1, 698.2, 698.3, 343, 908

[56]           References Cited

U.S. PATENT DOCUMENTS

| 86,154 | 1/1869 | Hiltz . |
| 1,456,931 | 5/1923 | Parker . |
| 2,995,858 | 8/1961 | Rathmann . |
| 3,496,982 | 2/1970 | Pierre . |
| 5,579,600 | 12/1996 | Burns ...................................... 43/44.83 |

*Primary Examiner*—Jack W. Lavinder
*Attorney, Agent, or Firm*—Oblon, Spivak, McCelland, Maier & Neustadt, P.C.

[57]           ABSTRACT

A fish hook A1 includes a shaft 5 and an eye 4 formed on one end of the shaft. The eye 4 can be connected with a split ring 2 connected with a lure 1. The eye 4 is thinner toward its end opposite to the shaft 5.

2 Claims, 9 Drawing Sheets

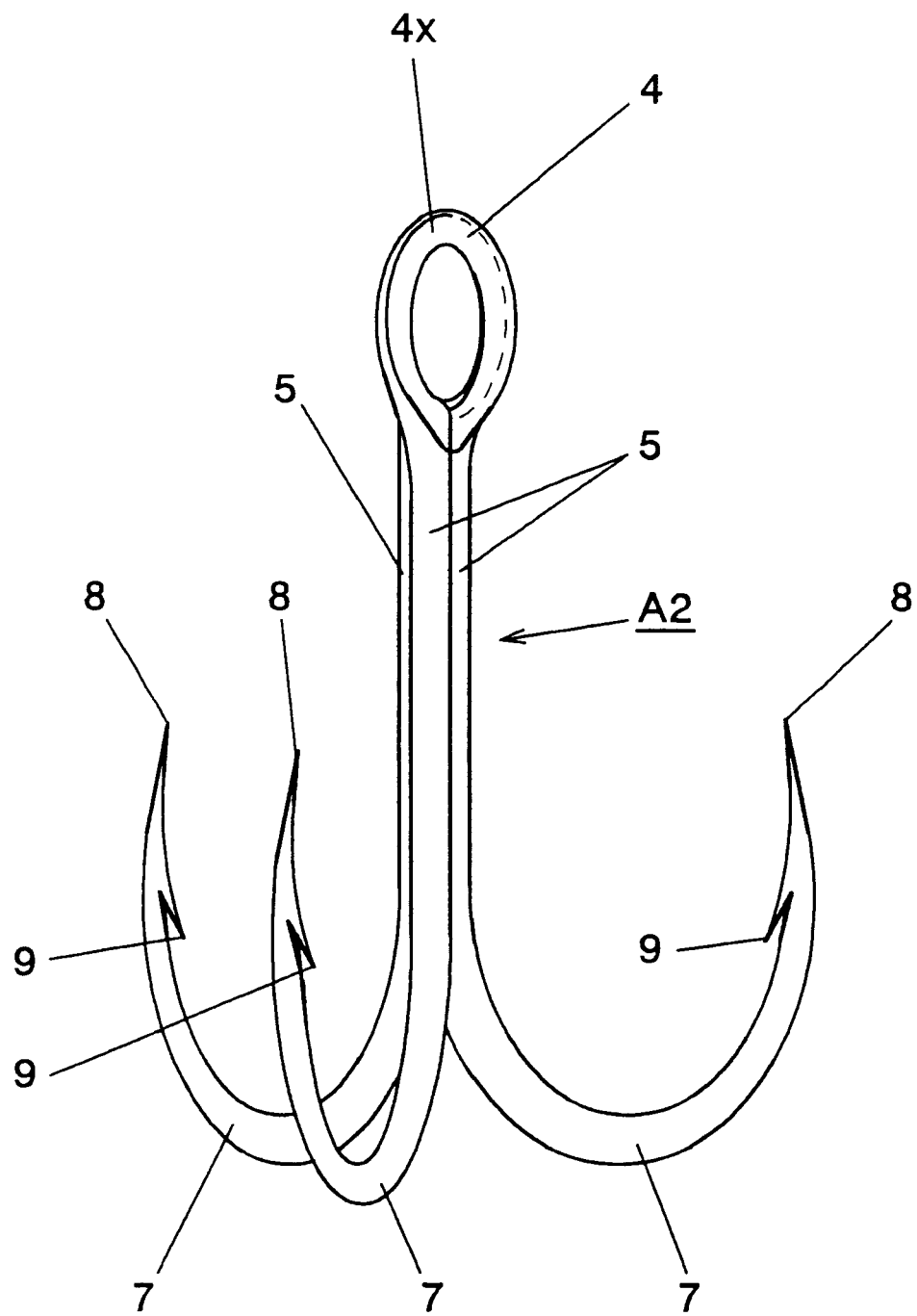

Fig.7A
PRIOR ART
Fig.7B
PRIOR ART
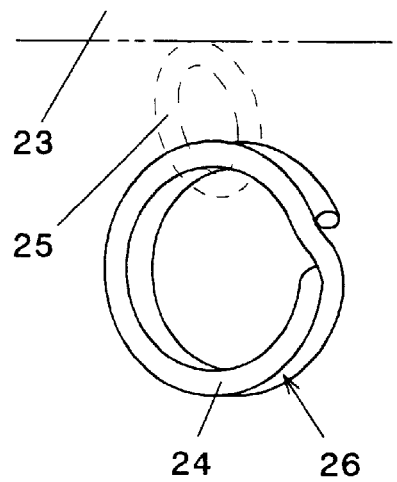
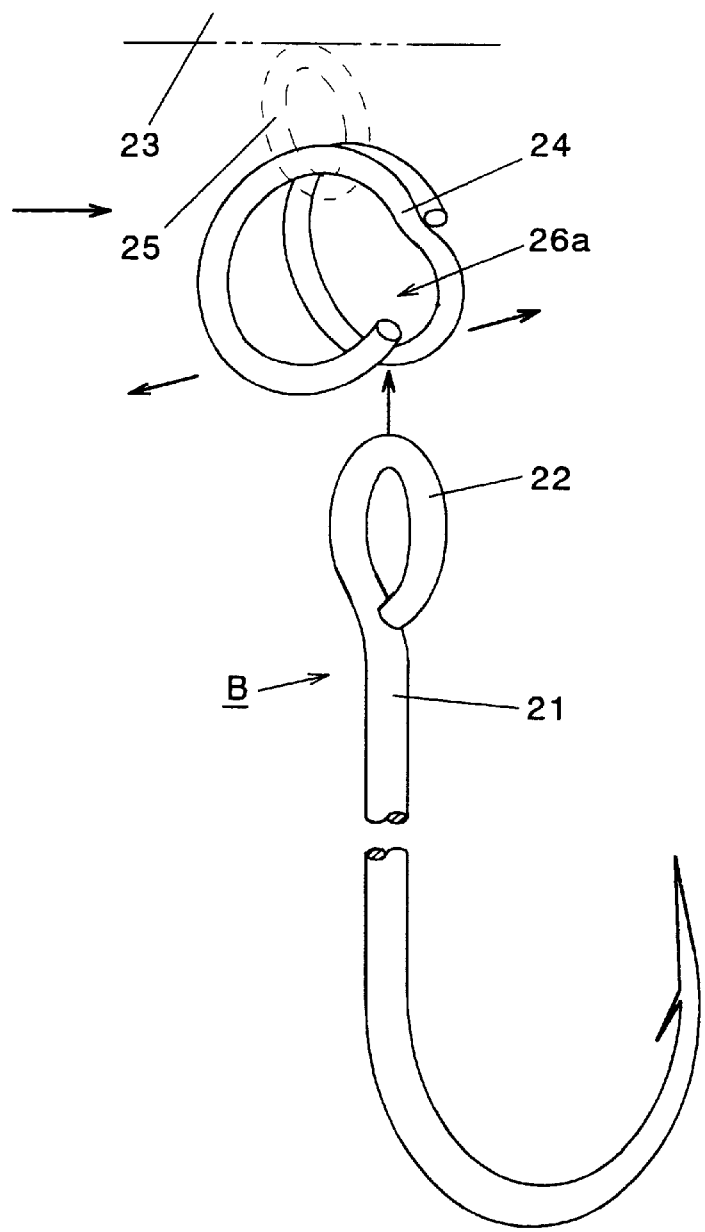

6,073,385

1

FISH HOOK

BACKGROUND OF THE INVENTION

1. Field of the Invention

The present invention relates to an improvement in a fish hook for connection to a split ring connected to a lure.

2. Description of Related Art

FIGS. 6, 7A, 7B and 9 of the accompanying drawings show a conventional fish hook B, which includes a shaft 21 and an eye or spade 22 in the form of a ring formed on the top of the shaft. The shaft 21 and eye 22 have the same diameter. The eye 22 is uniform in thickness "t" between both its ends.

A lure 23 has a connecting or fitting ring 25 fixed to it, which is connected with a split ring 24. The split ring 24 is connected with the hook eye 22. The split ring 24 may be made of steel wire which can be hardened or quenched. The wire is coiled spirally by two turns. The coiled wire is hardened to be sufficiently elastic and very hard. Otherwise, the split ring 24 may be made of stainless wire, which is only curved.

FIGS. 7A and 7B show how to engage the hook eye 22 with the split ring 24. First, the lure 23 and this ring 24 are held by one hand. The other hand holds a special purpose pair of pliers (not shown) for split rings. The pair of pliers is forced into the nip 26 between the turns of the split ring 24 to form a space 26a between them near one end of this ring as shown in FIG. 7B. Then, the top of the hook eye 22 is forced into the ring space 26a by hand, and engaged with the adjacent end of the split ring 24. Then, the hook eye 22 is moved along the ring space 26a to be connected with the split ring 24. At a suitable time during this movement of the hook eye 22, the pair of pliers is removed.

Because the split ring 24 is hardened, it is very difficult to open this ring with the special purpose pair of pliers. Besides, it may be necessary to perform the foregoing operation, with the hook B, which has a sharp point, the pair of pliers, the split ring 24 and the lure 23 all held by hand, on an unstable boat. It is difficult for even a veteran fisherman to perform such a complex operation quickly without being injured.

SUMMARY OF THE INVENTION

It is an object of the invention to provide a novel fish hook having an eye which can be connected with a split ring of a lure simply without using a special purpose pair of pliers.

A fish hook according to a first aspect of the invention includes a shaft and an eye formed on one end of the shaft. The eye can be connected with a split ring connected with a lure. The eye is thinner toward its end opposite to the shaft.

A fish hook according to a second aspect of the invention includes a shaft and an eye formed on one end of the shaft. The eye can be connected with a split ring connected with a lure. The eye is thinner at its end opposite to the shaft than at its end adjacent to the shaft.

It is easy to force the thinner end of each of these hook eyes into the nip of the associated split ring without using a special purpose pair of pliers. It is therefore simple to connect the hooks with the rings.

BRIEF DESCRIPTION OF THE DRAWINGS

Preferred embodiments of the invention will be described with reference to the accompanying drawings, in which.

2

Figure 1:
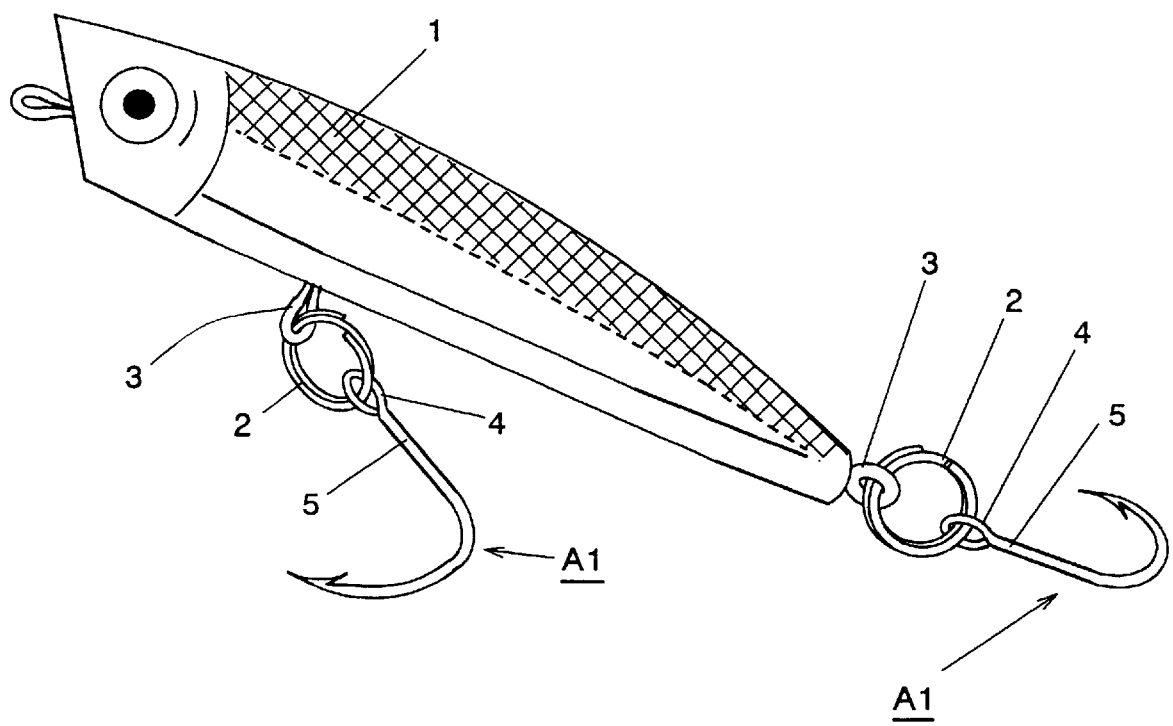
FIG. 1 is a side view of a lure fitted with fish hooks embodying the invention.
Figures 2A, 2B:
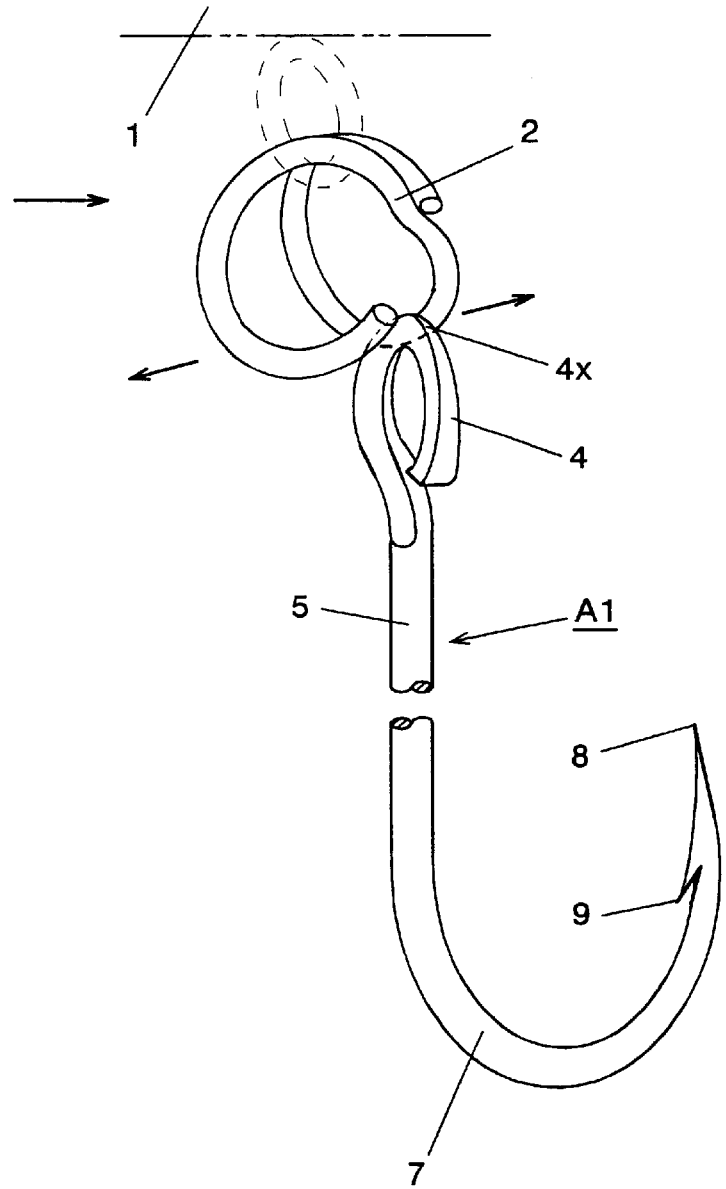
Figure 4:
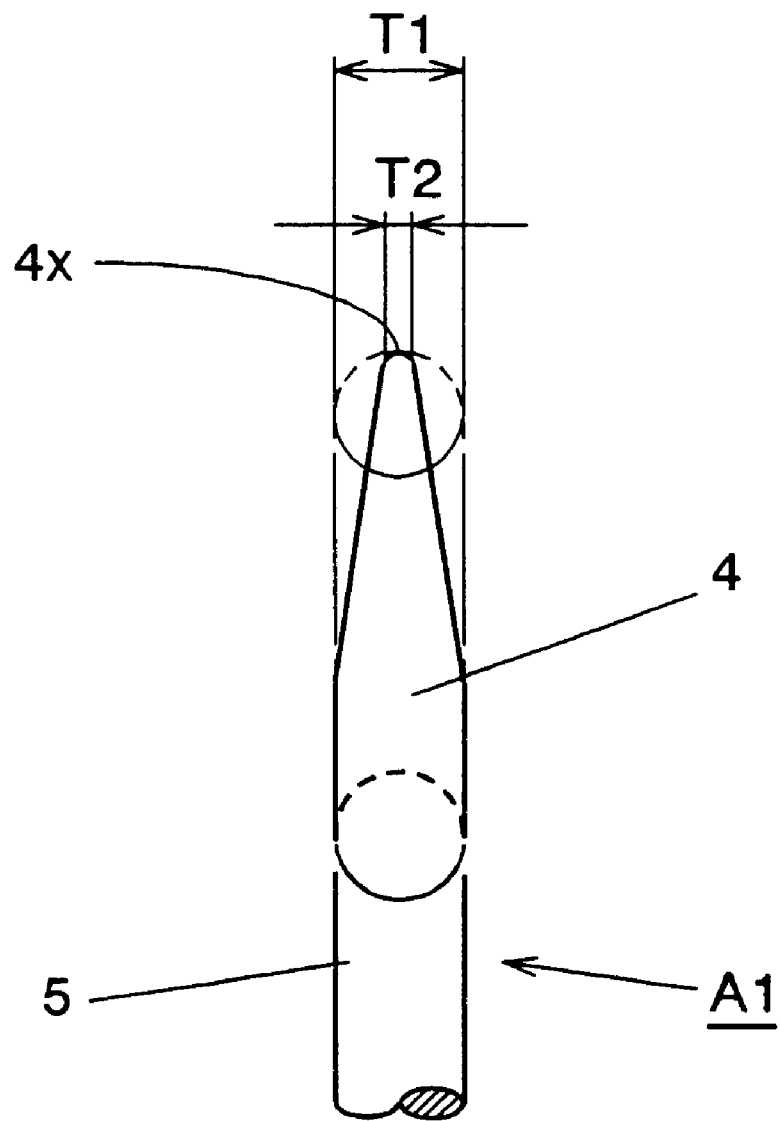
Figure 5:
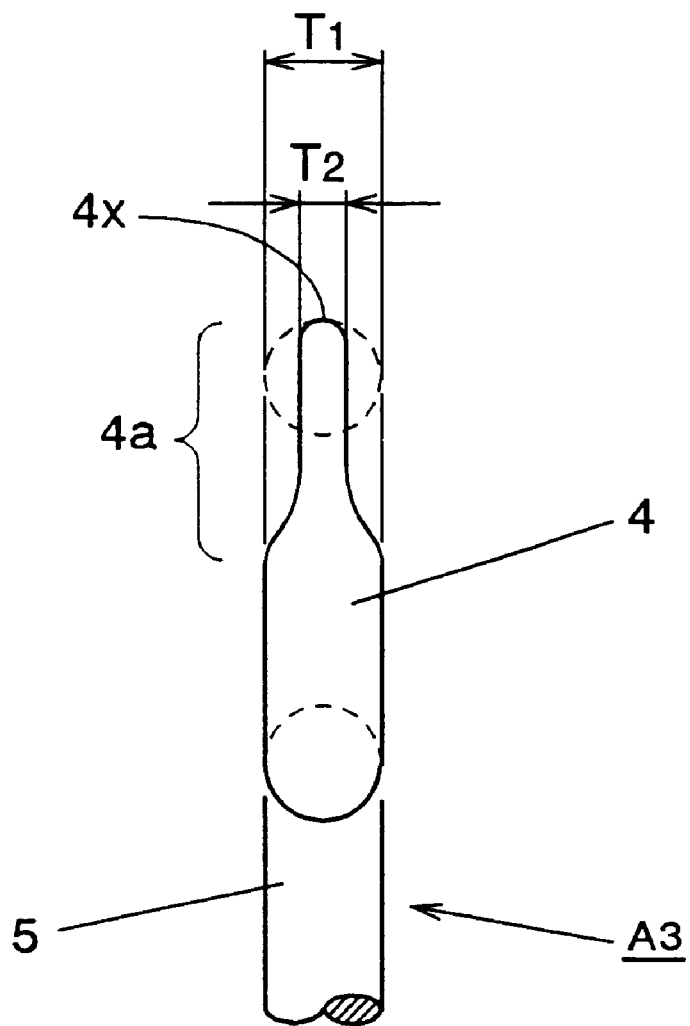
Figure 6:
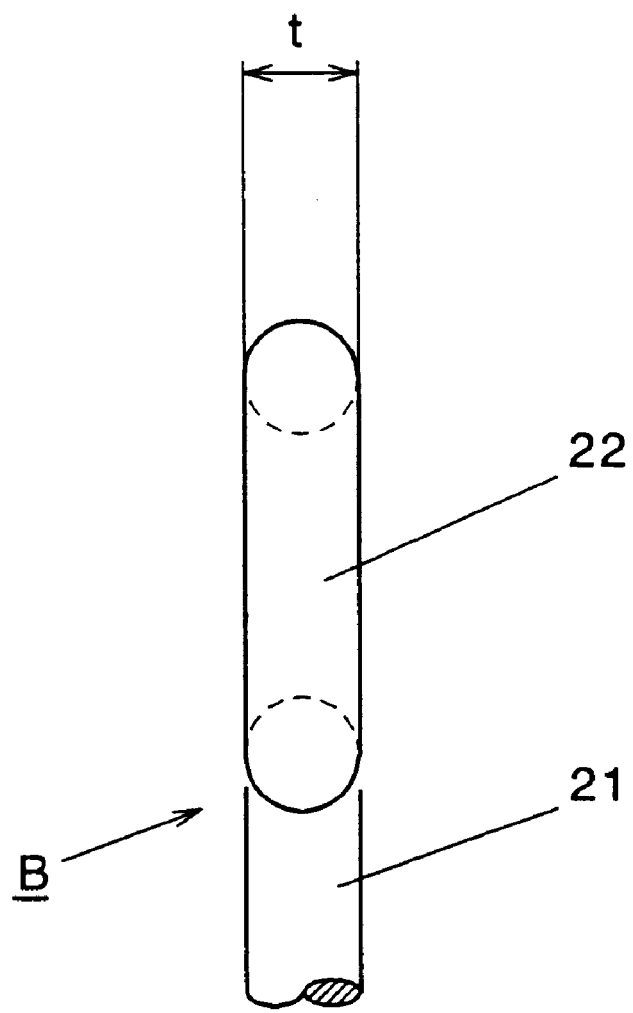
Figure 8:
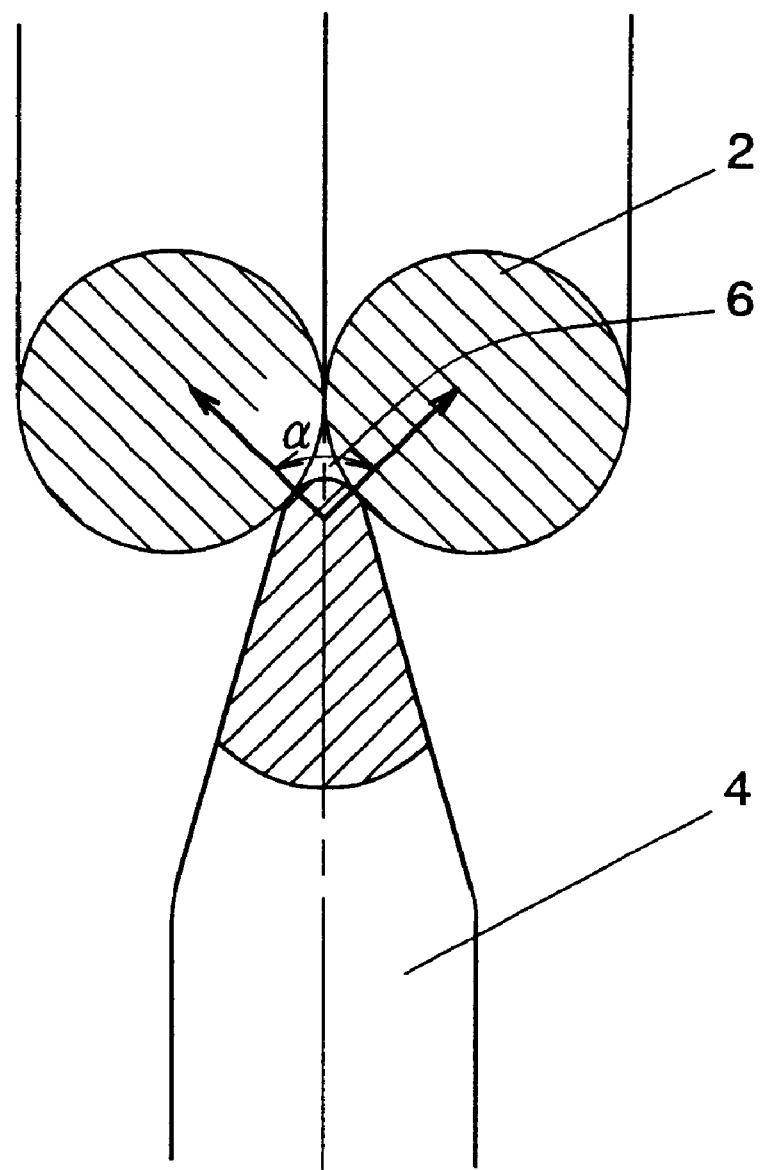
Figure 9:
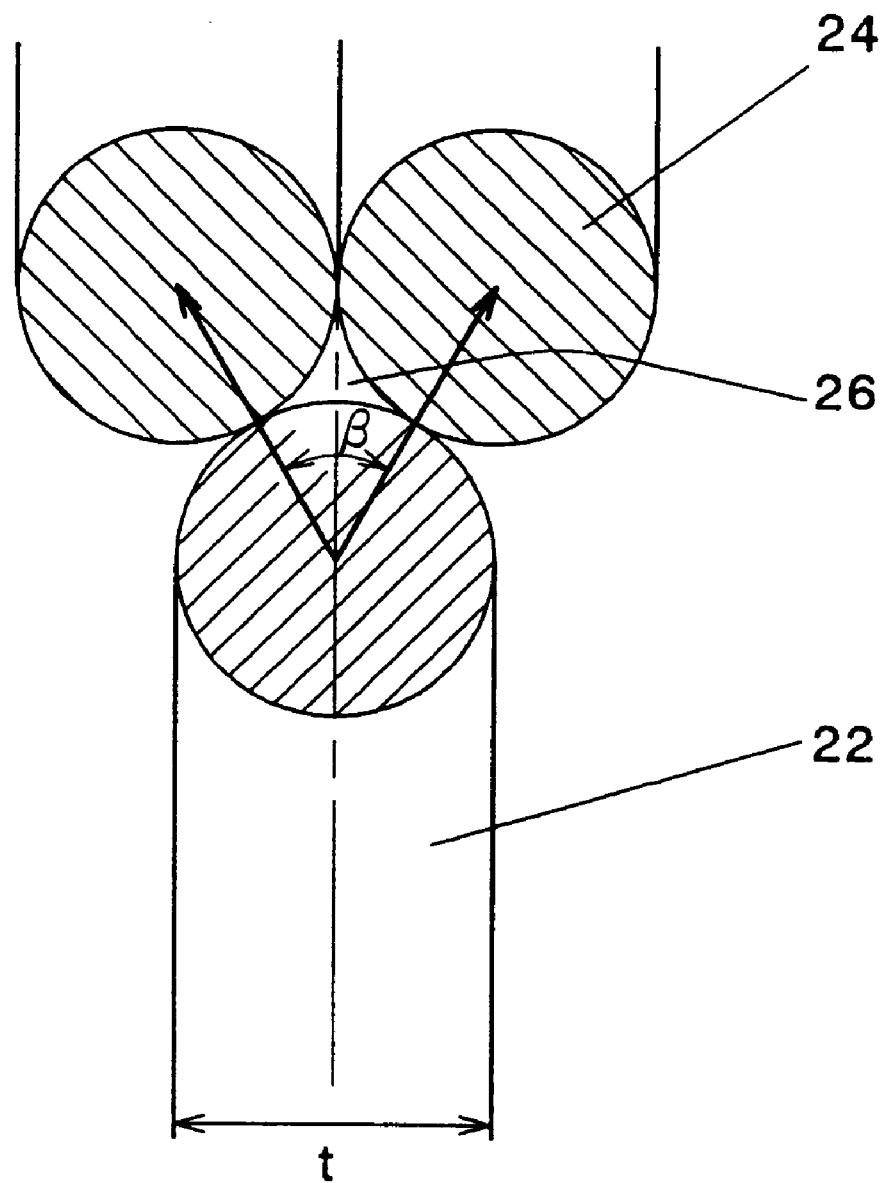

FIGS. 2A and 2B are perspective views showing the procedure for connecting each of the hooks shown in FIG. 1 with the associated split ring;

FIG. 3 is a perspective view of a treble hook embodying the invention;

FIG. 4 is a partial side view of one of the hooks shown in FIGS. 1, 2A and 2B;

FIG. 5 is a partial side view of another fish hook embodying the invention;

FIG. 6 is partial side view of a conventional fish hook;

FIGS. 7A and 7B are perspective views showing the procedure for connecting the conventional hook with a split ring;

FIG. 8 is a sectional view showing the relationship between the eye of each of the hooks shown in FIGS. 1, 2A, 2B and 4 and the associated split ring being connected with the eye;

FIG. 9 is a sectional view showing the relationship between the eye of a conventional fish hook and a split ring being connected with the eye.

DETAILED DESCRIPTION OF PREFERRED EMBODIMENTS

With reference to FIG. 1, a lure 1 is a metal strip in the form of a small fish or other bait, which attracts a big fish's attention. The lure 1 has two connecting or fitting rings 3 fixed to its abdomen and tail.

A conventional split ring 2 is connected swingably to each of the connecting rings 3. The split ring 2 may be made of steel wire which can be hardened or quenched. The wire is coiled spirally by two turns. The coiled wire is hardened to be sufficiently elastic and sufficiently hard. Otherwise, the split ring 2 may be made of stainless wire, which is coiled spirally by two turns.

With reference to FIG. 2B, a fish hook A1 embodying the invention has a shaft 5 and an eye or spade 4 in the form of a ring formed on the top of the shaft. The eye 4 is connected with the split ring 2. The hook A1 also has a bend 7 extending from the bottom of the shaft 5. The bend 7 terminates with a point 8 and a barb 9.

As shown in FIG. 4, the lower half of the hook eye 4 has a thickness T1, and the upper half is thinner upward 4x. The eye top has a thickness T2.

With reference to FIG. 5, a fish hook A3 embodying the invention has an eye 4. The lower half of the eye 4 has a thickness T1, and the upper half 4a has a thickness T2 smaller than the thickness T1. It is necessary that the halves be connected through gentle slopes.

The tapered or thinned portion of each hook eye 4 may be formed by press working, cutting work or another method. This portion may be formed at a suitable time in the first, middle or last stage of forming the hook. In general, such a portion is formed after the eye 4 is formed by bending. The eye 4 is wrought on both its sides, but might be wrought on its one side only.

The procedure for connecting the hook A1 with the split ring 2 will be explained below. As stated above, the upper half of the eye 4 of the hook A1 is thinner upward 4x. It is therefore possible to force the eye top into the nip between the turns of the split ring 2 without using a special purpose pair of pliers.

Specifically, with reference to FIG. 8, the thin top 4x of the hook eye 4 can enter the outer space 6 between the turns of the split ring 2 deeper than the top of the conventional hook eye 22 can as shown in FIG. 9. When the top of the hook eye 4 is pushed into the nip between the turns of the split ring 2, it separates the turns. The pushing force acts in two directions on the split ring 2. The angle α between the directions is remarkably wider than the angle β of FIG. 9, and therefore more effective for the pushing force to separate the ring turns.

Once the turns of the split ring 2 are separated, the wedge effect enables this ring to slide on the slopes of the hook eye 4. Therefore, the eye 4 can engage simply with the ring 2. As a result, there is no need for a special purpose pair of pliers or another tool, and it is possible to fit the hook A1 to the split ring 2 quickly, even on a boat or in another unstable place.

Of course, two or more fish hooks A1 may be fitted to each split ring 2.

FIG. 3 shows a treble hook A2 embodying the invention. The hook A2 has an eye 4, three shafts 5 fixed together, and three bends 7 each extending from one of the shafts 5. The bends 7 are spaced at angular intervals of 120 degrees. The upper portion of the eye 4 may be formed as shown in FIG. 4 or 5. Of course, the eye 4 might be wrought on its one side only.

The invention may also be embodied by a double hook (not shown). The upper portion of the eye of this hook may be formed likewise.

What is claimed is:

1. A fish hook comprising:

a shaft and an eye in the form of a ring formed on one end of the shaft for connection with a split ring connected with a lure, the eye having a thinner cross-section toward the end thereof opposite to the shaft configuring said eye to create a wedge for separating opposing sides of a split ring.

2. A fish hook comprising:

a shaft and an eye in the form of a ring on one end of the shaft for connection with a split ring connected with a lure, the eye having a thinner cross-section at the end thereof opposite to the shaft than at the end thereof adjacent to the shaft configuring said eye to create a wedge for separating opposing sides of a split ring.

* * * * *